United States Patent [19]

Czarno

[11] Patent Number: 5,944,987
[45] Date of Patent: Aug. 31, 1999

[54] MULTIPURPOSE COMBINATORY OIL, AIR, GAS, & POLLUTION FILTRATION SYSTEM

[76] Inventor: Yanush Edward Czarno, P.O. Box 2064, Miami Beach, Fla. 33140

[21] Appl. No.: 08/929,661

[22] Filed: Aug. 30, 1997

[51] Int. Cl.$^6$ ............................. B01D 35/06; B01D 47/02
[52] U.S. Cl. .................................. 210/180; 55/421; 96/1; 96/243; 96/317; 184/6.25; 210/195.1; 210/205; 210/223; 210/257.1; 210/258; 210/259; 210/296
[58] Field of Search ............................. 184/6.25; 55/421; 96/1, 2, 3, 13, 243, 317, 333, 337, 342, 383, 417, 424; 204/660, 664, 665; 210/180, 195.1, 205, 220, 222, 223, 243, 252, 258, 257.1, 259, 294, 296, 322, 695, 748

[56] References Cited

U.S. PATENT DOCUMENTS

| | | | |
|---|---|---|---|
| 2,208,673 | 7/1940 | Hopkins | 96/317 |
| 4,585,599 | 4/1986 | Czarno | 261/18.2 |
| 4,620,917 | 11/1986 | Nozawa et al. | 204/695 |
| 4,826,592 | 5/1989 | Taylor | 210/223 |
| 5,752,997 | 5/1998 | Roth | 96/342 |

*Primary Examiner*—David A. Reifsnyder
*Attorney, Agent, or Firm*—M. K. Silverman

[57] ABSTRACT

The present invention especially for machine applications, also improves the invention air cleaning device, U.S. Pat. No. 4,585,599 dated Apr. 29, 1986. The present invention is the said air cleaning method U.S. Pat. No. 4,585.599 and which is in addition forming a multipurpose combinatory oil, air, gas, and pollution filtration system based on processing oil through purified water mixtures, includes water of hydration, in general, is based on the interaction of two liquid systems distinguished in nature and viscosity from each other. For example: oil as the solute which include polluted particles mixed within and purified water (H20) as the solvent and which are optionally charged electrostatically with opposite charges positive and negative. In addition, electro-magnetic separator is provided within for attracting magnetic particles from the oil into the water, for disposal. The distinction between solvent and solute when both are liquids is attracting polluted particles to the solvent from the solute through the strength of intermolecular attractions and which include optionally within the process of the intermolecular attractions, addition of opposite electrostatic charges induce in the oil and the water. After the solute, or the oil is circulated and recirculated through the solvent and through the specific chamber construction of attracting pollution particles to a solvent form a liquid solute, it is warmed to up to 100 or 120 degrees Celsius to remove and steam out the water remaining mixed within.

7 Claims, 3 Drawing Sheets

MULTIPURPOSE COMBINATORY OIL, AIR, GAS, & POLLUTION FILTRATION SYSTEM

BACKGROUND OF THE INVENTION

The present invention relates in general to filtration systems for oil, air, gas, and pollution incorporating electromagnetic separators and opposing electrostatic charges. More particularly to the invention air cleaning device which was granted a U.S. Patent dated Apr. 29, 1986, U.S. Pat. No. 4,585,599, the present invention is an improvement to the invention air-cleaning device U.S. Pat. No. 4,585,599, dated Apr. 29, 1986; also, the improvement incorporate magnetic system within the stages of the intermolecular forces in a two liquid system.

The present invention also integrates air scrubbers or wet air cleaning systems with dry air cleaning systems for additional air cleaning response, and regulates the amount of moisture in the air according to requests. For machine or industrial machine environments, the air should have less H2O molecules but oil molecules in the air are appreciated or exceptable, the present invention improving the patented air cleaning device dated Apr. 29, 1986, for air cleaning capability, for machines industrial environment and for combustion engines air cleaning, alone or with a combination of which include fiber or criss cross screen filtration systems for the air input to the engine. Further the drawing disclosure relative to combustion engine lubricating oil cleaning and engine air input cleaning also for output engine exhaust gases and pollution cleaning are advanced filter developments of said original invention air cleaning device dated, Apr. 29, 1986, U.S. Pat. No. 4,585, 599, but are not mentioned in the original claims and the air cleaning device text from April 1986.

Earlier in time the inventor over looked the oil cleaning properties. Also, in this general period of time the oil was cheap for the automotive field. It did involve occasional oil change and oil filter change, but this was not very expensive, recently the automotive oil became more expensive including the maintenance fees for changing the oil. This fact makes the invention cost effective because with the present invention integrated in the lubricating oil filtration system it is like changing the engine oil everyday without paying for the oil and oil change maintenance fees. The goal is a maintenance free engine and said invention is bringing such a goal into reality reducing engine wear and tear, plus reducing maintenance in reference to the general scope of said solution. A patent search under the name "Filtration System including Liquid Magnetic Solution," was performed on Aug. 5, 1991, by the patent attorney, Melvin K. Silverman; registration Number: 26,234. Eight related patents have been mentioned in reference, but only two patents in the search related practically to the present invention and to the use of magnetic field within a fluid or liquid as part of an oil filter unit, this being U.S. Pat. No. : 4,705,626 dated 1987 to Morell; and, the U.S. Pat. No. 4,826,592 dated 1989 to Taylor.

The present invention was disclosed to inventor's company under the name "Affiliated Inventors" from Colorado Springs, U.S.A., on Aug. 25, 1995. There filing: No. 27339 acting as the inventor agent, Affiliated Inventors disclosed the invention under the U.S. Government Disclosure Document Program which is supposed to be retained for two years in Washington, D.C. Government Filing number 382159, dated Sep. 6, 1995, under the name, "Combinatory, Oil, Gas, and Pollution Filtration System Through Water mixtures Incorporating Electromagnetic Field Within." An appraisal was performed by a for mentioned, "Affiliated Inventors," their filing number: 27,339 from Colorado Springs, Colorado and has been sent to the inventor on Sep. 1, 1995. The appraisal was positive resultingly the inventor hired Affiliated Inventors to proceed with the patent search. Their filing number: 27,339 in reference to search report discloses the variety of the patents in the field and also to update the prior search done by the attorney, registration number: 26,234 Melvin K. Silverman. The patents numbers disclosed in this search are as follows:

U.S. Pat. No. 4,585,599
U.S. Pat. No. 5,149,438
U.S. Pat. No. 5,340,472
U.S. Pat. No. 5,370,993
U.S. Pat. No. 5,389,252

More particular: U.S. Pat. No. 5,149,438 dated Sep. 22, 1992 to Hebert, under the title, "Method For Magnetically Treating Water In A Closed Loop Heat Transfer System," which appear to be related to the present invention. U.S. Pat. No. 5,370,993 dated Dec. 6, 1994, to Tarnowski Et Al, under the title "Reversible Agglutination Mediators," U.S. Pat. No. 5,389,252 dated Feb. 14, 1995 to Morrick under the title "Magnetic Filter Aid." U.S. Pat. No. 5,340,472 dated Aug. 23, 1994, to "Heck Deceased" under the title, "Apparatus For Processing Waste From The Machinery of Ferromagnetic Materials." Particularly in the view of U.S. Pat. No. 5,149,438, which relate only to heat transfer system, the heat transfer system subject is not the primary subject relative to the present invention. First of all the primary subject of the present invention is polluted oil cleaning through interaction with water, in general, maximizing the oil drops total surface for additional interaction with the water on a molecular level, by reducing the oil drops to practical size and passing the oil drops through purified water. The second objective of the said invention is to create a recirculation means for the oil drops with in regulatory osmotic or dialytic mechanism in the water using pressures and methods for practical reduction of the oil drops size without clogging the filtration plate within the water. The third objective is incorporating electromagnetic separator within a solution including opposing electrostatic charges in the water and oil.

The fourth objective is the heat transfer system relative to U.S. Pat. No. 5,149,438 to Hebert Hebert is using mostly water in his heat transfer system, the present invention in relation to multi-objective level is possibly and optionally using used motor oil and used transmission oil in addition to water in the automotive radiator. The used motor oil and the metal that remain in it is functional for heat transfer systems in general. The engine can be cooled by this approach together with air cooled plates as an option for variety of engines and environments, in which the engine is functioning within, relative to this option the fifth objective is combined oil sources for channeling the used lubricating oil to multipurpose use for example: to the air cleaning system of the engine alone or together with the up to date in fashion air cleaning filter models using the common fiber air filter. The automotive engines in the old models of many vehicles did use motor oil solution for the engines air cleaning system, the air passed through the oil and through this process of scrubbing of the air, the air was cleaned from particles and pollution which was trapped in the oil. After the oil was saturated and has accumulate much particles and pollution it was changed, occasionally causing more maintenance and sometimes oil spills if not changed timely and properly. The present invention solves this problem through channeling part of the used motor oil to the oil based air cleaning system of the engine and for recleaning of this oil by the present approach. The sixth objective is further use of the motor oil and the oil coming from the air cleaning portion of the automotive engine and that originate from the earlier stages of the used motor oil. After it is recleaned, it is channeled to the exhaust output of the engine for pollution cleaning or emission cleaning through the process of scrubbing the pollution with the said oil.

In general the pollution cleaning device can be installed before the muffler instead of the muffler or after the muffler, the pollution in the gaseous output of the engine is trapped in the oil when it passes through it to the atmosphere. The mentioned pollution trapping oil is recleaned through the present oil cleaning system. The present system is forming additional embodiment in addition to the invention U.S. Pat. No. 4,585,599, "Air Cleaning Devise," dated April, 1986, and comprising further development relative to combustion engines. Also, include development of the air cleaning device in relation to engine pollution control flowing from the exhaust to the atmosphere. The seventh objective is recleaning the transmission oil through the system described above. Cleaning the oil for further use in the transmission and then in further stages, according to external temperature, mixing the recleaned motor oil with the recleaned transmission oil, then channeling this mixture to the engine air cleaning system; also, to the exhaust gaseous output for engine, gas, and pollution cleaning system. The seventh objective will also reduce transmission wear and tear. Fewer oil changes will be needed and maintenance simplified and reduced. The seventh aforementioned objective relative to the present invention which through unified approach are forming a new combination which distinguish the present invention from prior art. In addition, neither of the cited inventions is using water as a fully programmable filtration element within a filtration system as described in general in the said U.S. Government Document Disclosure Program Number: 382159, dated Sep. 6, 1995 and as described particularly in the present invention. The Hebert U.S. Pat. No. 5,149,438 is using water in relation to heat transfer system only. He claimed that his filter removes larger particles, but permits smaller particles to remain suspended. Distinguished from his invention and relative to oil, the present invention objective is also to remove the smaller particles from the oil subject to filtration. Regarding the lubrication function, the engine can run smoother because the smaller suspended metal particles are removed from the oil by the present invention, at any chosen time. So, the engine system can be ready with purified refined oil everyday of operation.

FIELD OF THE INVENTION

The field of the invention relates to apparatus and method for improvement of performance of integrated oil, air, gas, and pollution filtration system and specifically to automotive oil, air, gas, and pollution filtration system.

DESCRIPTION OF PRIOR ART

U.S. Pat. No. 5,149,438, relates to reducing scale and corrosion in a close loop heat exchange system and to the implementation of magnetic field acting upon the water scales and corrosion. U.S. Pat. No. 5,370,993, relates to reversibly aggregating particles suspended in liquid through the addition of polyonic polymer and magnetic binding particles including magnetic field gradient to separate the aggregates from the fluid or liquid. The invention has particular application to separation of cells from biological fluids such as blood, urine etc. U.S. Pat. No. 5,389,252, relates to oil filters which trap and remove magnetic and non magnetic particles from engine oil, in particular improving oil filter performance to trap magnetic particles. U.S. Pat. No. 5,340,472, relates to processing wastes from machinery of ferromagnetic materials through washing solution including means of a magnetic field. U.S. Pat. No. 4,585,599, relates to air cleaners in particular to which scrub dirty air by passing it through the surface of a liquid. The recirculation of the scrubbing liquid through a second cleaning liquid solves the problem of built up dirt near the point of impact by the dirty air. U.S. Pat. No. 4,705,626, relates to an oil filter module, incorporating permanent magnets for retaining magnetical sludge. U.S. Pat. No. 4,826,592, relates to magnetic filter apparatus, particularly for oil filters, for internal combustion engines.

SUMMARY OF THE INVENTION

Most of the cited patents use magnetic fields for removal magnetic particles or magnetic intermetallic compounds from oil, specifically the magnetic field, is used only in reference to acting upon a single liquid system comprising magnetic particles in addition to using magnetic field only within a single liquid. The present invention is using magnetic field further in a second liquid mixed within the first liquid which possibly all ready has been cleaned up to a limited degree by the cited magnetic filtration methods, but is further purified through mixing with a second in relation immiscaible liquid (water) which is further incorporating magnetic field within, to trap and remove remaining magnetic particles. Also, and in reference to U.S. Pat. No. 5,370,993, the present invention includes two immiscible liquids within a chamber system of which are optionally comprising opposite electrostatic charges. For example: positive electrostatic charged induced in the oil element and negative charge induced in the water element. The opposite electrostatic charge will give to the power of intermolecular attractions more strength and more particles of pollution will be attracted from the oil element to the water element for disposal. The inventor disclosed the general concept in reference to the present invention confidentially to a marketing company carrying the name, Inventors Submission Corp, Inc., under the name: "Integrated Solutions Liquids Thermodynamic Magnetic Filtration System," their file number: #MI-850, abbreviated I.S.L.T.M.F. is dated Apr. 26, 1991. This said system abbreviated "I.S.L.T.M.F." is for purifying oil, gas, air, and pollution for various machinery, power tools using air for a transmission of power and engine application. As a general approach to production the I.S.M.T.L.F. could be formed using a variety of die stamping, forging, machining, etc. Several relatively new processes are available for part production such as multiaxis, fully programmable, numerically controlled machining, laser and electrodischarge machinery. In a wide variety of a machinery applications, it becomes necessary to provide filtered air for the operation of power tools and machines. Typically, the air may be consumed by the machine, etc., as is the case for an internal combustion engine. It may also be used to provide cooling to machinery components. In pneumatic systems applications, air is used as a power transmission substance. The air may also be processed for some other end use, such as heating, air conditioning or ventilation. Air and gas may also be desirable to filter as some post processing function, as is the case with air pollution control machinery. There may also be many different reasons for the need for filtered air, in an internal combustion engine, the entry of dust and other contaminants into the engine intake may cause damage to the cylinder walls of the engine when they become lodged against the piston ring. Such particles may also form deposit on intake and exhaust valves, or reduce effectiveness of the lubricating system if the contaminants, or particles become suspended in the oil. For applications where air is used to cool machinery or components, filtration is also desirable because dust or contaminants that accumulate on such parts can reduce the cooling effect. In pneumatic systems applications, dust or contaminants could clog valves. It is also desirable to provide filtered air for the commercial industrial, or residential building environment. For pollution control systems, it is desirable to remove as much of the pollution as possible to reduce the potential damage to the external environment. Specific to the proposed "I.S.L.T.M.F." is the use of a liquid scrubbing system to extract particulated material of pollution from unfiltered air or gas. Liquid scrubbing techniques are generally well known; however, various prior art scrubbing techniques have relied on the use of a single scrubbing liquid. In such scrubbing process it is possible for the surface of the scrubbing liquid to become entirely saturated with particulates of pollution. The concept of the "I.S.L.T.M.F." solves this problem by using a second liquid for a two liquid scrubbing and cleaning technique, which is incorporating electromagnetic separator, in two distinguished liquids, and which are interacting with each other. For example, the second cleaning fluid extracts the contaminants or the particulted matter of pollution from the first fluid acted upon by using a fully programmable recirculation process. This multstage, fully programmable thermodynamic recirculation process of a two liquid system incorporating within the intermolecular forces electromagnetic separators and further within a two distinguished in a nature liquids having within a distinguished viscosity is the above present invention's uniqueness and novelty. In relation to the proposed "I.S.L.T.M.F.," it could be of interest to review the trends in the industry segment for dust collection and air purification machinery. Since the implementation of the Clean Air Act in the 1970's, the industrial pollution control machinery industry has grown dramatically, largely due to the need of the manufacturers and electric utilities to implement the nations air-pollution regulations.

In reference to the invention: "Air Cleaning Device," U.S. Pat. No. 4,585,599, a test was performed which was not mentioned in the above invention. In accord to these test results the primary experiments also show a degree of smoke and gas removal by the a aforementioned air-cleaning device, so the said cleaning water elements is also valuable for smoke and gas disposal. The laboratory performing the test mentioned in their report to the inventor, dated Oct. 27, 1982, that the "possible" uses of the air cleaning device are as follows:
1) "Use for removal of organic fumes using separate special oil."
2) "Addition of perfume to allow room perfume."
3) "Use of disinfectant for bacteria control."
4) "Specific control of chemical or dust plants."

In addition, the testing laboratory states: "Due to the heterogeneous nature of the oil water mix samples were taken from the water pass, separate samples were taken for total solids and suspended solids. Due to the oil extraction method used, results of suspended solids would be slightly high due to oil formation in the filter paper."

"The purpose of the test was to establish if the oil coated particles would allow the dirt to penetrate the water layer, and if, in fact, would dissolve in the water phase." "The little difference between the suspended and total solids established that most of the particles are not dissolved in the water phase. Due to the heterogeneous nature of the mixture, the accuracy reported is average for separated samples." To dissolve more oil coated particles in the water pass the oil drops should be smaller to increase the total interacting surface of the oil within the water. A fully programmable circulation and recirculation (activated thru a thermostat having a warming mechanism) of the oil coated particles having temperature of 80 to 90 degrees Celsius in the water pass that is having a warming mechanism including a thermostat attach to an electric wire which is activating the pump, this warming mechanism will permit more particles saturated within the oil to dissolve in the hot water pass. In addition, electromagnetic separator will attract more particles to the water pass. Further, electrostatic field can be induced in the solutions of oil and water. Positive charge in the water element and negative charge in the oil element for attracting more particles of pollution to the water (H2O) for disposal. Neither of the oil filters available in the market are filtering all the dirt particles from the oil; the fiber filter remove larger particles. In general, the magnetic or electromagnetic filter removes smaller particles. In addition to this magnetic system, the present invention removes the smallest particles, but not less damaging through a two liquids intermolecular forces which are forming a solutions interaction and which are incorporating electromagnetic separators within,in two liquids distinguished in nature and viscosity; especially, within an oil cooling water solution for the purpose of not reducing the effectiveness of the magnetic fields because of the hot oil temperature.

DETAILED DESCRIPTION OF THE INVENTION

Figure 1:
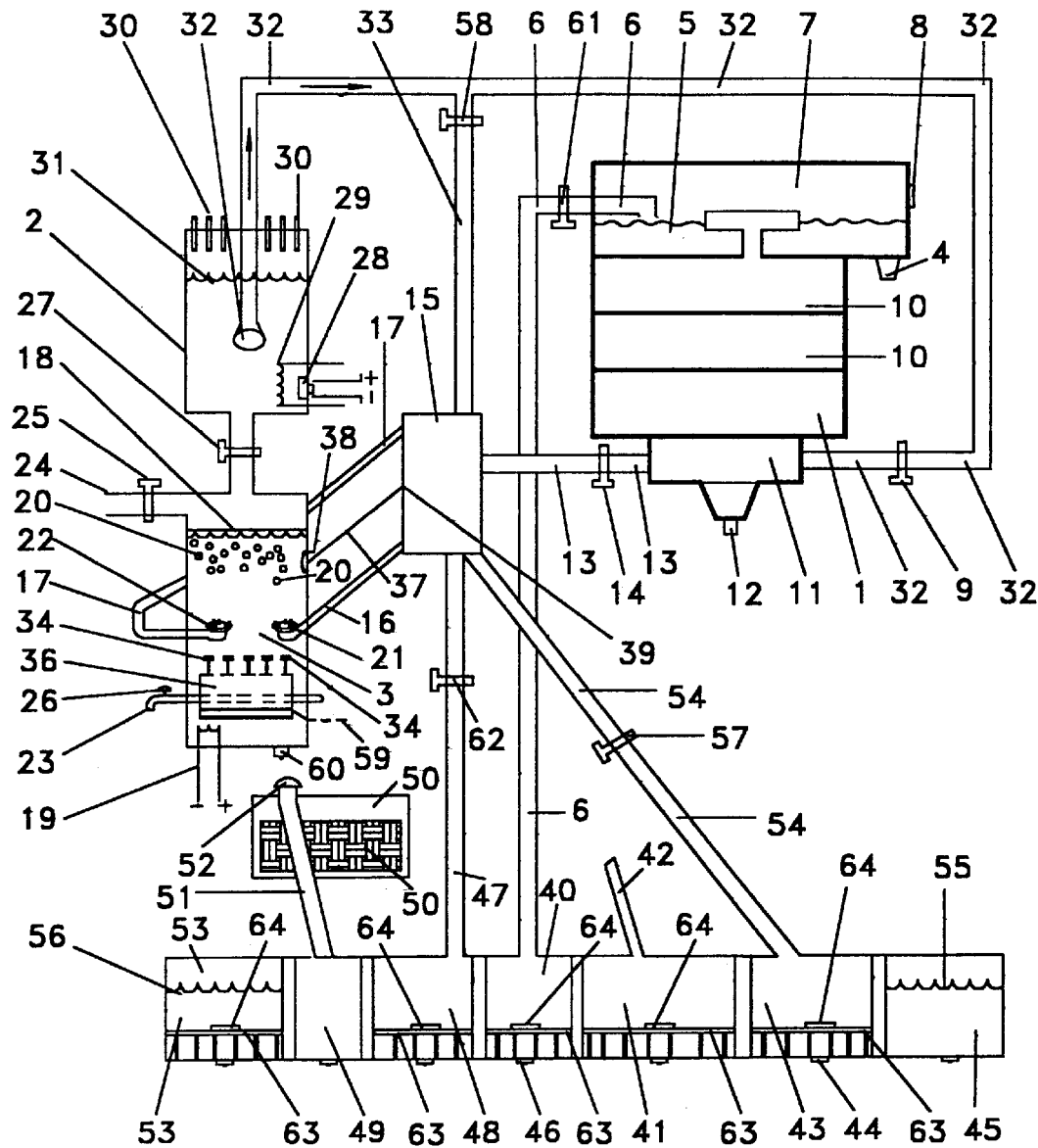
FIG. 1, is a schematic cross sectional cutaway view of the said multipurpose combinatory oil, air, gas, and pollution filtration system embodiment integrated with a combustion engine. Also, in the same principle shown, the system shown is functional in regard to any combinatory kind of oil cleaning, air cleaning, gas cleaning, and pollution cleaning, whether alone or as functional combination with other methods, for additional filtration effect.

When it is desirable to change, or repurify the lubricating oil every other day, in chamber 11, Engine 10, see FIG. 1 on the spot, or any other lubricating oil, especially automotive oil for commercial vehicles, it will be especially of value to install the present combinatory polluted oil purification device with in commercial vehicles, or engine systems. The proposed combinatory thermodynamic oil cleaning system in Chamber 3, and 2, see FIG. 3, is based on the tendency of a fluids which are intermixed to equalizing the concentrations of the materials within one of the fluids into the second fluid or into the thermodynamic solution comprising the intermix of the fluids through the intermolecular forces within and further based on a programmable and thermodynamic circulatory interaction of two liquids, or fluid system having the faculty of combination with electromagnetic, or electrostatic field induce within optionally distinguished stages of said two liquid(s) or fluid(s) circulatory interaction which include warming mechanism 19, see FIG. 2, that is activated with thermostat 38 having electric wire 37 attached to pump 15 in point 39, activating pump 15 after the water in Chamber 3 is warmed up to 80–90 degrees celsius, see FIG. 2. The water level 18, in said Chamber 3, having bottom polluted water drain valve 60, is maintained through a pure water source within with in Chamber 45, see FIG. 1, showing water level 55, by connecting chamber 45 to pipe 24, having valve 25. Therefore, after activating warming mechanism 19 through thermostat 38 within the water in chamber 3, see FIG. 2, and opening valve 14, integrated within engine system 10, see FIG. 1, the lubricating engine oil is drawn by multi-channel, multipurpose pump 15, from oil chamber 11, through pipe 13, to water chamber 3, with pipe(s) 16, and 17. The oil then flowing through oil filtration plate 21, and 22, see FIG. 2, through holes in the plates ranging, in general from ¼ to ½0 of an inch in diameter. This is for reducing and regulating the oil drops size and for forming regulatory optionally osmotic or dialytic mechanism in the water. The lid of said plates 22, and 21, see FIG. 2, comprising the holes, can be changed, regulating as desired, the oil drops 20, sizes approximately from ¼ to ½0 of an inch in diameter. After flowing through the holes in the plates, 21 and 22, the oil form drops 20, see FIG. 2, in the water which are flowing upwards in the pure water (which is cleaning by molecular attraction and association the oil drops) up to the water level 18, sharing opposite oil surface 18, floating upon the water surface 18. The oil drops 20 unite after flowing to the water surface 18, see FIG. 2. After the united oil drops pass valve 27, to enter the oil chamber 2, see FIG. 3, the oil in chamber 2 is fed back to the multi-channel, multi-purpose pump 15, through connecting valve 58, see FIG. 3, connecting pipes 32 and 33. From said multipurpose pump 15, the oil is recirculated through the water chamber 3 which was warmed up to 80–90 degree Celsius. In general, after one hundred cycles of the engine oil with in chamber 2, through the water with in chamber 3, see FIG. 3, the engine lubricating oil in chamber 2 is repurified sufficiently for reuse. To remove magnetic particles or magnetic intermetallic compounds from the water, electromagnetic separator 36, see FIG. 2, attach to electric wire 59, is incorporated within the process.

Figure 2:
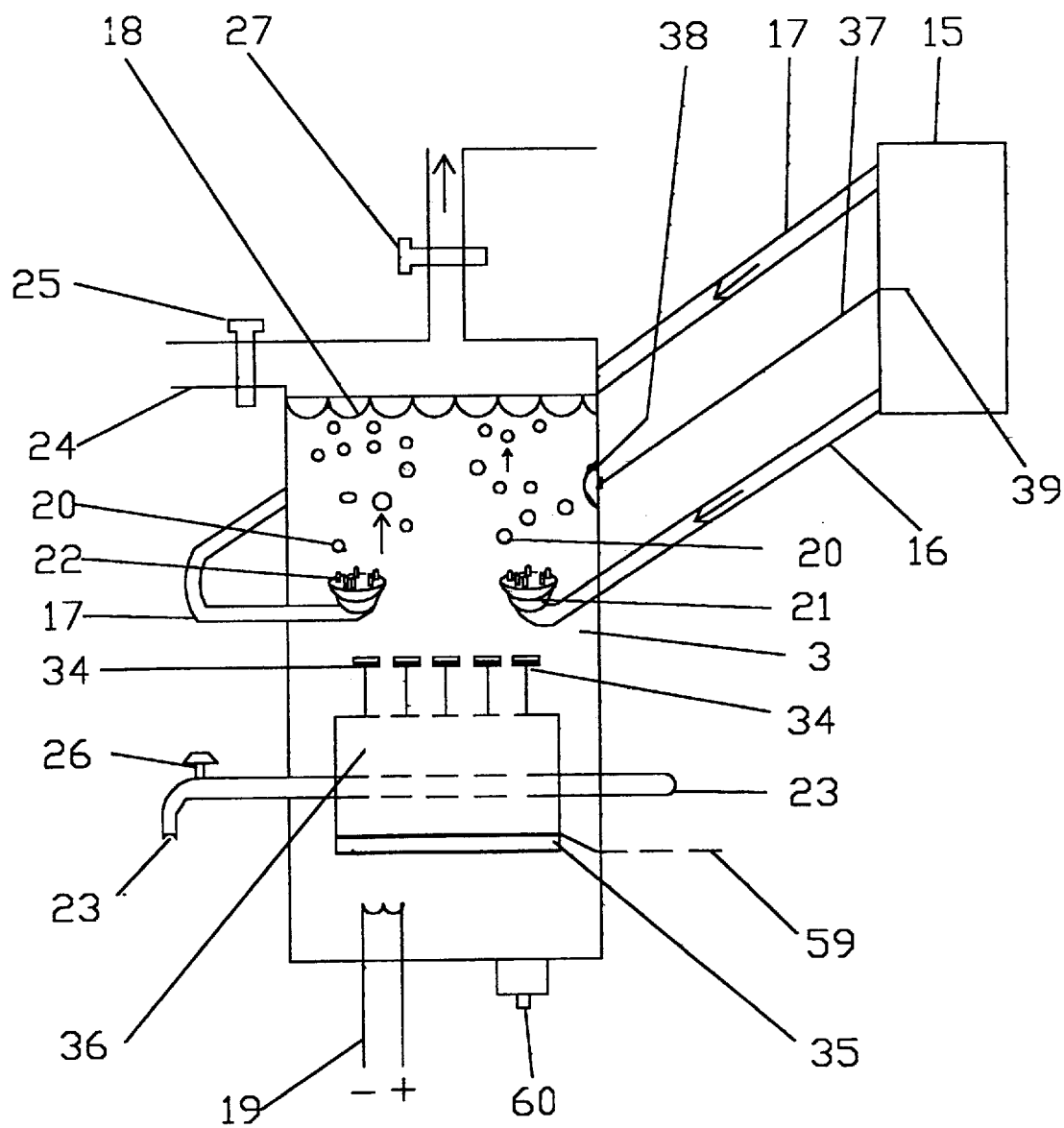
FIG. 2, is enlarged partial view of FIG. 1 showing the polluted oil recirculated through the oil cleaning water chamber included through the specific chamber construction of attracting particles of pollution to the water from the oil.
Figure 3:
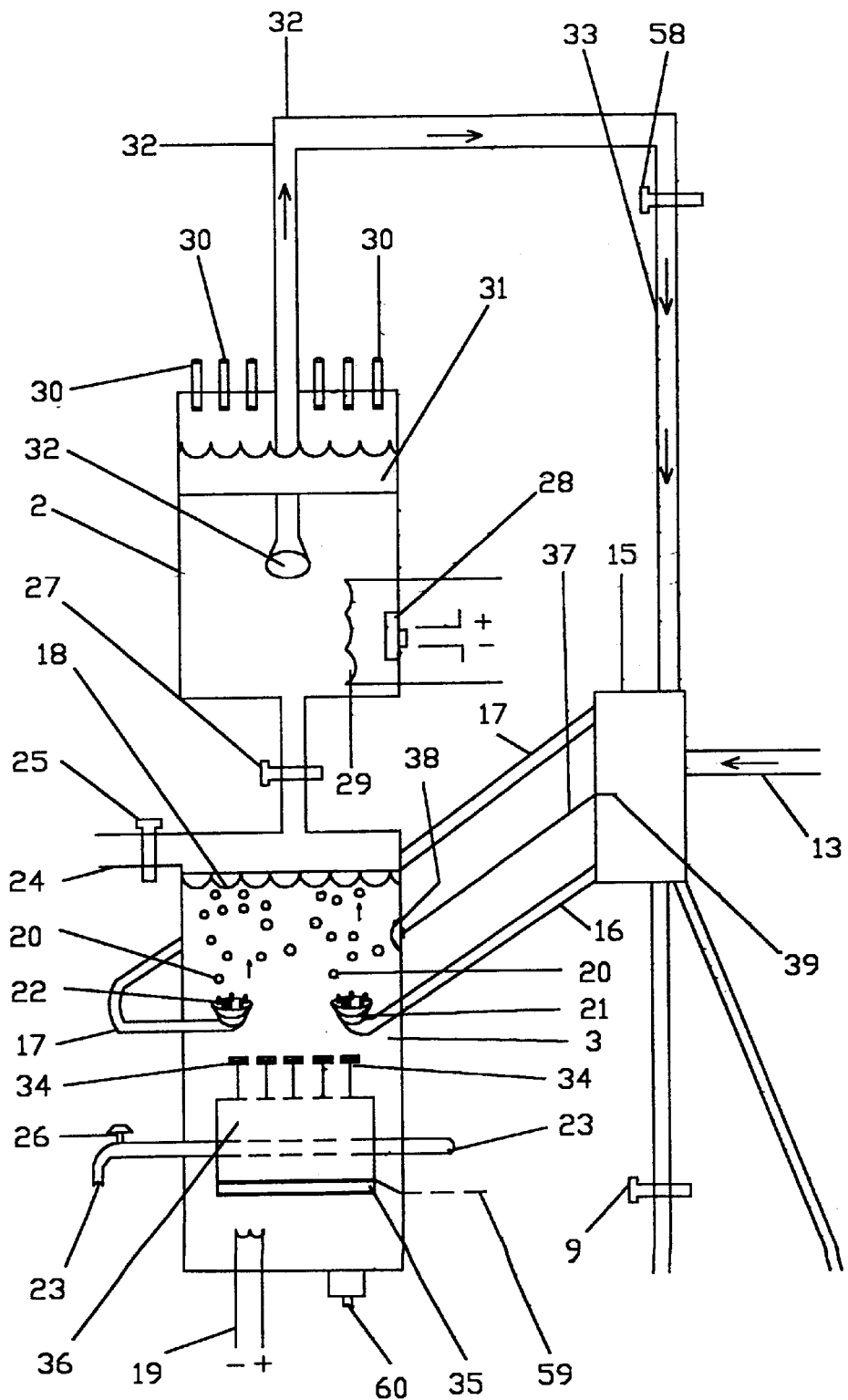
FIG. 3, is enlarged partial view of FIG. 1 which is showing the recirculated polluted oil cleaning and processing chambers.

The magnetic particles in the water are attracted to electromagnetic points 34, and are trapped in electromagnetic chamber 36, see FIG. 2. In addition, permanent magnetic trap 35 is placed in the bottom of electromagnetic chamber 36 for keeping the trapped suspended magnetic particles in the water in chamber 3 bottom. The oil cooling water solution and method incorporating magnetic fields and optionally an electrostatic induction within the cooling water are for the purpose of not reducing the effectiveness of the magnetic fields because of the hot oil temperature which is reducing the magnetic fields effect. Chamber 3 can be cleaned by flushing out the water through drain 23, valve 26, or bottom drain valve 60, see FIG. 2. For additional cleaning of chamber 3, see FIG. 2, valve 27 is closed, a water hose is attached to pipe 24, valve 25, is opened and chamber 3 including the magnetic trap is pressure-washed after opening valve 26, through pipe drain 23, or drain 60, see FIG. 2. After a fore mentioned approximately one hundred recirculating cycles of the oil in chamber 2, see FIG. 3, through the water in chamber 3, the engine oil is repurified sufficiently with in chamber 2. Therefore, said pump 15, is turned off. Valve 27 is regulating the flow of the oil from chamber 3 to the oil chamber 2, which is having oil level 31, see FIG. 3, valve 27 is shutoff after two hours, or at any beneficial time to let remaining water in oil chamber 2, to sink to water chamber 3. After a fore mentioned period of time valve 27, see FIG. 3, is shutoff, electric warming mechanism 29 is activated through thermostat 28, see FIG. 3. The oil chamber 2, having oil level 31, is heated to 100 degrees Celsius, to steam out remaining water with in the oil in chamber 2. Approximately after one half hour to one and one half hours the water remaining in chamber 2 is steamed out through the pipes outlets 30, see FIG. 3. Also, the oil in chamber 2 is optionally heated by the engine function and the temperature that the engine generated, in general. This temperature can be used to increase the temperature in chamber 2, to one hundred degrees Celsius for steaming out the remaining water through outlet pipes 30, see FIG. 3, having within a floating valve to prevent overflow of liquid and liquid spilling from oil level 31, see FIG. 3, but are letting the said steam from remaining water to flow out. The oil in chamber 2 can be drained through pipe 24, after opening valves 25 and 27, see FIG. 3. Also, for reasons of maintenance and for cleaning of chamber 3 and 2. After that process of steaming out all of the water from chamber 2, the oil from chamber 2, is flowing through pipe 32, see FIG. 1, to lower in height lubricating oil chamber 11, after valve 9, see FIG. 1, is set open, then engine oil chamber 11, see FIG. 1, is filled up and valve 9, is closed, so that the repurified oil in chamber 11, can be used again for the engine lubrication function. The process described can be automated by a computer or can be implemented by push button mechanism.

Remaining used repurified motor oil is used in the air cleaning chamber 7, see FIG. 1, of the engine. Air enters through air inlet 8, and is cleaned through oil 5, or oil surface 5 within chamber 7, having drained valve 4, see FIG. 1. As already shown in automotive prior art, in reference to one liquid, oil based air cleaning system. Then the cleaned air is used for the engine function. The remaining purified oil mentioned in the above said process can be directed further to chamber 40, see FIG. 1, having drained valve 46, which is also an oil storage for regulating oil level 5; in principal, oil-based engine air cleaning system within chamber 7, through pipe 6, having valve 61, see FIG. 1. When it is desirable to use for multipurpose ends, use, or change lubricating engine oil and the oil cleaning chamber 3 has to be maintained, or found to be too dirty for functioning, the engine oil can be drawn by pump 15, from chamber 11, by opening valve 14, with in pipe 13, and valve 57, with in pipe 54, to chamber 43, see FIG. 1, having drained valve 44, for future repurification. The engine oil can be drawn also after opening valve 14 within pipe 13, by the multi-channel, multi-purpose pump 15, to chamber 48, connected to pump 15, through pipe 47, having valve 62, see FIG. 1, for future repurification through a recirculation within cleaning chambers, 3 and 2, using the process described above. The engine oil in chamber 11, can be replaced manually with the repurfified oil from chamber 53 which is main repurified oil storage showing oil level 56. This cost-effective arrangement of oil chambers which include permanent magnetic system 63, see FIG. 1, having a grip handle 64, for the removal of magnetic particles in reference to a longer period of time of said lubricating oil storage time and which is having a grip handle 64, for the removal and cleaning, manually of magnetic system 63, this magnetic cleaning within the oil storage system for the purpose such that the engine system can be ready with purified oil for the lubricating engine oil system. The ready repurified oil storage system comprising the oil which was drained from the engine oil within chamber 11, drain 12, and was replaced through main magnetic storage of lubricating engine oil with in chamber 53 is effective for engines that have to function without sufficient intermission all the time. For military engines, race cars, race boats; especially, when a new engine oil is not available so the engine system can be ready with repurified refined oil everyday of operation. Further, in military vehicles in war time in the desert, or when water runs out from the radiator and is not available, the used engine oil from chamber 11, having valve drain 12, see FIG. 1, is drawn to chamber 49, and used optionally, and possibly with remaining water for the cooling temperature transfer system of the engine within radiator 50, see FIG. 1, having inlet lead 52, the radiator 50, connect to chamber 49, through pipe 51. Said engine oil in chamber 49 can be mixed manually with used transmission oil from engine chamber 1, which is stored in chamber 41, showing connecting pipe 42, for reducing the viscosity of the used motor oil and for said engine cooling temperature transfer system, which is substituting part of the water, within the radiator 50. After the mixture of used transmission oil within with in chamber 41, having connecting pipe 42, with the used motor oil within chamber 49, see FIG. 1, achieves proper viscosity. The said mixture is drawn to lower in height radiator 50, through pipe 51. This cooling temperature transfer system can be used in the radiator to keep the engine running periodically until more water is available; further, a new cooling system for engines can be developed relative to the present invention using used motor oil and used transmission oil mixtures for use within a radiator system and by exposure of said radiator system to lower air temperature. Further, the said mixture of metal containing motor oil and transmission oil can be filtered to functional degree by the present invention so optimal portion of the small metal particles will remain in the oil mixture for optimal temperature transfer effect without clogging the radiator, internal pathways or pipes by too large metal particles. To simplify without repeating the description, as has been explained and described in reference to cleaning mineral oil exposed to air pollution, and engine oil exposed to engine pollution including metal particles or intermetallic compounds. The transmission oil within any system, or an automotive system is also cleaned by the process described above, drawn to a chamber system manually for future repurification and cleaning by mentioned above oil processing chambers, 3 and 2, see FIG. 3. For example, in general the transmission oil can be drawn from the engine transmission chamber 1, see FIG. 1, manually to chamber 41, having connecting pipe 42, then, by connecting two multi-channel, multi-purpose pump 15, with pipe 42, see FIG. 1, the transmission oil is recirculated with in cleaning chambers 3 and 2, (after they have been pressure washed by connecting to a water hose) with multi-channel pump 15, through the mechanism described and the process shown above, in reference to lubricating motor oil, for cleaning of the transmission oil so that it may be used again with in said transmission 1, see FIG. 1. Also, in general the described present invention has the faculty of combination with variety of air cleaning systems available up to date and is the said air cleaning method U.S. Pat. No. 4,585,599 and which is in addition forming: multipurpose combinatory oil, air, gas, and pollution filtration system in reference to air, gas, and pollution cleaning for machines, engines, variety of industrial environments, household environments etc. The present invention has the faculty of combination also with:

A) An electrostatic precipitator removing air particles down to 0.01 microns and traps molds and smoke particles.

B) An ionizer enhanced air cleaner performance and helps freshen air.

C) A particle prefilter and charcoal prefilter, which helps to eliminate odors.

The present invention has also the faculty of combination with a variety of oil filtration methods available up to date for machinery and engines, according to request and need. Nevertheless, the machine comprising the present invention can function alone. Accordingly, the present invention is showing and describing the preferred embodiment of the present invention, and it is to be appreciated that the invention may be embodied otherwise then is specifically shown and described, and that within said embodiment certain changes may be made in the size, proportion, form and arrangement of the parts without departing from the underlying idea, or principles of this invention with in the scope of the claims appended herewith.

I claim:

1. An oil processing system for automotive vehicles, the system comprising:

(a) a water chamber including means for magnetic attraction situated in a lower region thereof;

(b) means for pumping used engine oil from an automotive engine block oil collection area to said water chamber;

(c) a water reservoir;

(d) means for pumping water from said reservoir to said water chamber;

(e) means for flushing metallic particles collected within said magnetic means within a trap situated within said water chamber; and (f) means for collecting oil processed by said magnetic means situated within said water chamber into a oil chamber separate from said water chamber.

2. The system as recited in claim 1 further comprising:

heating means situated within said water chamber.

3. The system as recited in claim 1 further comprising:

heating means situated within said oil chamber, whereby water within said collected oil is thereby evaporated.

4. The system as recited in claim 3, further comprising:

oil-based, air-scrubbing means positioned within an air intake conduit to said engine block, and upstream of a carburetor intake thereof.

5. The system as recited in claim 1 further comprising:

means for returning said processed oil to said engine block.

6. The system as recited in claim 1 further comprising:

a transmission fluid processing and storage chamber.

7. The system as recited in claim 1, further comprising oil-based, air-scrubbing means positioned within an air intake conduit to said engine block, and upstream of a carburetor intake thereof.

* * * * *